(12) United States Patent
Münstermann

(10) Patent No.: US 7,448,118 B2
(45) Date of Patent: Nov. 11, 2008

(54) APPARATUS FOR PATTERNING AND STABILIZING A WORKPIECE WEB BY USE OF AN REPLACEABLE PATTERNING SHELL

(75) Inventor: Ullrich Münstermann, Egelsbach (DE)

(73) Assignee: Fleissner GmbH, Egelsbach (DE)

( * ) Notice: Subject to any disclaimer, the term of this patent is extended or adjusted under 35 U.S.C. 154(b) by 0 days.

(21) Appl. No.: 11/884,430

(22) PCT Filed: Apr. 19, 2006

(86) PCT No.: PCT/EP2006/000429

§ 371 (c)(1),
(2), (4) Date: Aug. 15, 2007

(87) PCT Pub. No.: WO2006/087064

PCT Pub. Date: Aug. 24, 2006

(65) Prior Publication Data

US 2008/0066275 A1 Mar. 20, 2008

(30) Foreign Application Priority Data

Feb. 18, 2005 (DE) .................. 10 2005 007 757

(51) Int. Cl.
*D04H 1/46* (2006.01)
(52) U.S. Cl. .......................... 28/104; 28/167
(58) Field of Classification Search .............. 28/104, 28/105, 167, 103, 106; 492/28, 30, 32, 33, 492/38–40, 45, 47–50, 54; 162/368, 372, 162/373, 357
See application file for complete search history.

(56) References Cited

U.S. PATENT DOCUMENTS

| | | | | |
|---|---|---|---|---|
| 720,593 A | * | 2/1903 | Lindberg | ................... 162/285 |
| 3,590,453 A | * | 7/1971 | Bryand | ........................ 492/32 |
| 3,600,735 A | | 8/1971 | Jerabek | |
| 3,781,957 A | * | 1/1974 | Luthi | ........................ 492/32 |
| 4,196,496 A | | 4/1980 | Stauffer et al. | |
| 4,228,123 A | * | 10/1980 | Marshall | ..................... 28/105 |
| 4,756,638 A | * | 7/1988 | Neyret | ........................ 403/261 |

(Continued)

FOREIGN PATENT DOCUMENTS

DE 19546203 C1 3/1997

(Continued)

*Primary Examiner*—Amy B Vanatta
(74) *Attorney, Agent, or Firm*—Andrew Wilford

(57) ABSTRACT

The invention relates to a device for decorating and fixing a non-woven material (15) in the form of a web of endless fabric, said device comprising a screening drum (6) and a decoration shell (7) which surrounds the screening drum (6) from outside. The fibres (15) of the non-woven material, located on the decoration shell (7), are needled and fixed according to the decoration formed by the holes of the decoration shell (7) by means of energy-rich water jets (14) or air flows. The invention is characterised in that the decoration shell (7) and the screening drum (6) are interconnected by mechanical means (8, 9, 10) that can be easily detached. In a preferred embodiment, the decoration shell (7) comprises a counter-toothed ring (9) and the screening drum (6) comprises a toothed ring (8), said rings positively engaging in each other in such a way that a rotation of the decoration shell (7) and the screening drum (6) in relation to each other is prevented.

7 Claims, 3 Drawing Sheets

U.S. PATENT DOCUMENTS

| | | | |
|---|---|---|---|
| 4,868,958 A | * | 9/1989 | Suzuki et al. ............... 28/104 |
| 5,145,276 A | * | 9/1992 | Demange ................... 403/349 |
| 5,414,914 A | * | 5/1995 | Suzuki et al. ............... 28/105 |
| 7,308,743 B2 | * | 12/2007 | Fleissner ................... 28/104 |
| 7,310,859 B2 | * | 12/2007 | Fleissner ................... 28/104 |
| 7,350,279 B2 | * | 4/2008 | Noelle ..................... 28/104 |
| 2005/0015950 A1 | * | 1/2005 | Fleissner ................... 28/167 |
| 2005/0155200 A1 | | 7/2005 | Fleissner |

FOREIGN PATENT DOCUMENTS

| | | |
|---|---|---|
| EP | 1489213 A1 | 4/2004 |

* cited by examiner

APPARATUS FOR PATTERNING AND STABILIZING A WORKPIECE WEB BY USE OF AN REPLACEABLE PATTERNING SHELL

CROSS REFERENCE TO RELATED APPLICATIONS

This application is the US national phase of PCT application PCT/EP2006/000429, filed 19 Jan. 2006, published 24 Aug. 2006 as WO 2006/087064, and claiming the priority of German patent application 102005007757.9 itself filed 18 Feb. 2005, whose entire disclosures are herewith incorporated by reference.

An apparatus is known from WO 03/035955 [US 2005/0155200], for example, by means of which three-dimensional patterns are produced in a fleece or the like by blowing the fibers through a pattern sheet having openings that form the pattern, and then also stabilizing the fibers in the openings, since the fibers are displaced in the openings only to a limited depth, and then also needling the fibers against a supplementary support. The fibers may be displaced by means of water jets, although hot air, for example, may also be used as a medium for moving the fibers.

The structuring pattern sheet is usually radially fastened by means of screws to the front operator side and to the rear end of the water jet stabilizing drum, or to the drum in general. Frequent changing of the structure and thus of the pattern sheet is time-consuming. Such a pattern sheet, or more generally, a pattern shell, is sometimes pneumatically fixed to the operator side and the back side of the drum, using rubber tubes inserted at the periphery of the drum. The flexible nature of the attachment, which entails increased risk of damage to the rubber tubes during the replacement process, has proven to be disadvantageous.

Proceeding from an apparatus of the above-described type, the object of the present invention is to provide an apparatus by means of which a different pattern may be easily imparted to the fleece or the like.

The object is achieved according to the invention by use of an apparatus according to claim 1.

The apparatus according to the invention for patterning and stabilizing a fleece forming a workpiece web comprises a sieve drum and a pattern shell that externally surrounds the sieve drum, the fibers of the fleece located on the pattern shell being stabilized and also needled corresponding to the pattern formed by the holes in the pattern shell by means of high-energy water jets or by air flow. A special characteristic of the apparatus is that the pattern shell and the sieve drum are interconnected by quick-release mechanical means.

Advantageous embodiments of the apparatus are the subject matter of the subclaims.

In one preferred design of the apparatus, the sieve drum and the pattern shell positively engage with each other in such a way that rotation of the sieve drum and pattern shell relative to each other is prevented. In particular, for this purpose the sieve drum has a toothed ring and the pattern shell has a complementarily toothed ring.

In a further advantageous embodiment, fastening screws are provided on the apparatus in such a way that axial shifting of the pattern shell with respect to the sieve drum is prevented.

The mechanical means for connecting the pattern shell and sieve drum takes into consideration the fact that large mechanical forces may in particular twist the sieve drum and pattern shell relative to each other, whereas much lower forces may cause axial displacement of the pattern shell with respect to the sieve drum. With regard to these larger forces, positive-fit connections forming locking teeth are therefore provided, whereas end-face screw connections are sufficient for the lower forces.

An apparatus of the type according to the invention is explained with reference to the drawings as examples, that show the following:

Figure 1:
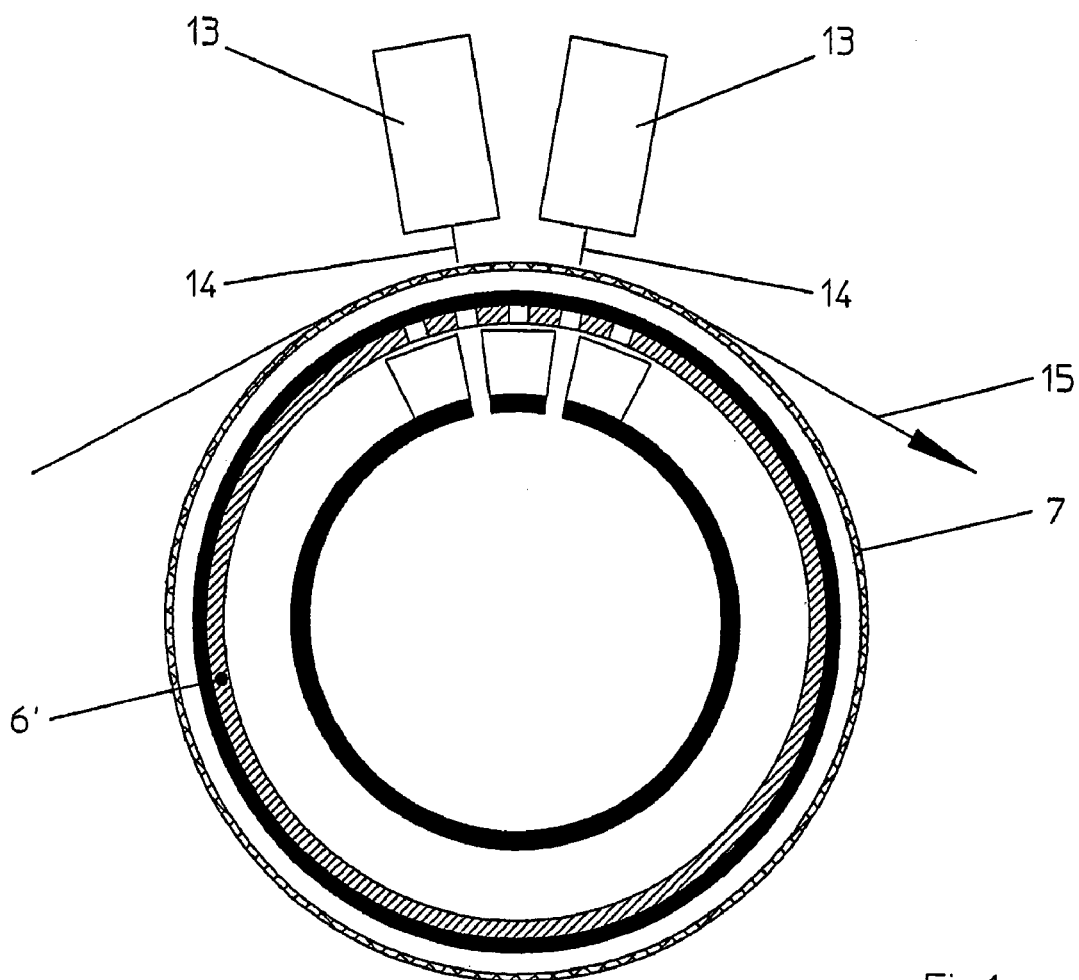
FIG. 1 is a cross section of a permeable sieve drum, perpendicular to the center axis thereof, under suction, and a pattern shell for producing a patterned fleece, having two nozzle beams outside the sieve drum.
Figure 2:
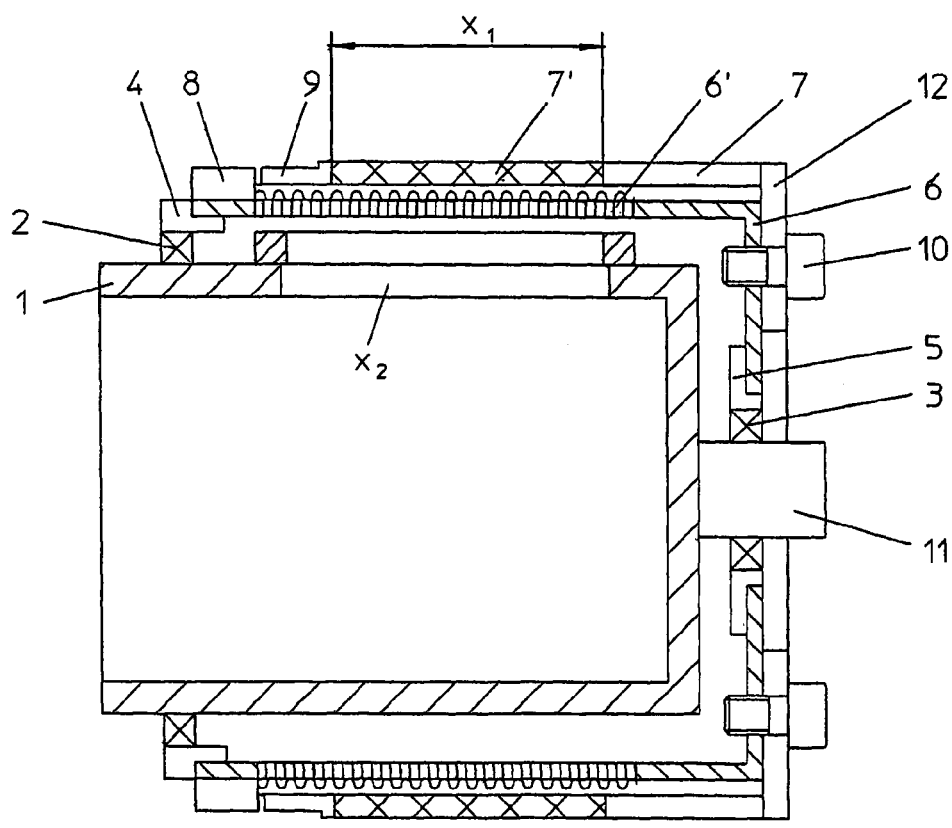
FIG. 2 is a longitudinal section through the center axis of the sieve drum and the pattern shell from FIG. 1.
Figure 3:
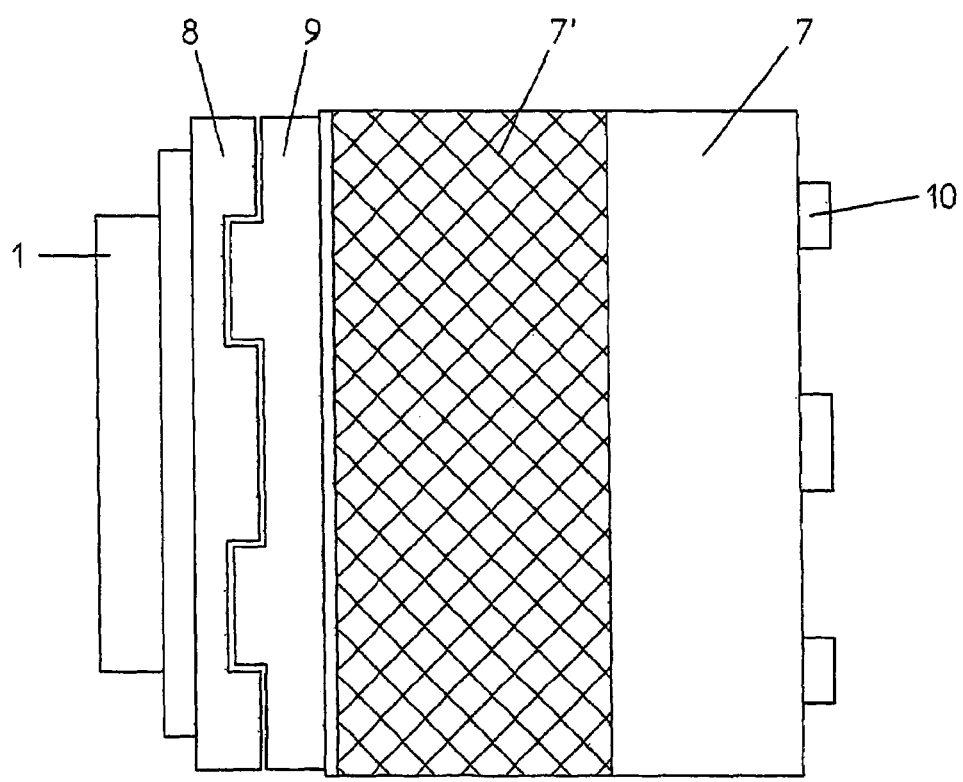
FIG. 3 is a side view of the sieve drum and the pattern shell attached thereto.

The sieve drum 6 shown in FIG. 1 includes additional peripheral parts that have been omitted here for the sake of clarity. The fleece 15 to be patterned runs directly over the sieve drum 1, with which one or more external nozzle beams 13 are directly associated. Each nozzle beam 13 is aligned axially parallel to the sieve drum 6, and the lower side of the nozzle beam turned toward with the sieve drum 6 is provided with a nozzle strip (not illustrated here) for discharge of water jets 14. As is customary, the sieve drum 6 for suctioning off the sprayed-on water is placed under suction, to which end a suction tube 1 illustrated in FIGS. 2 and 3 is positioned centrally inside the sieve drum 6, the suction tube having slots X2 open toward the sieve drum 6 and aligned with the nozzle beams. A structuring pattern shell 7 provided with a hole pattern is fitted to the outer surface of the sieve drum 6. The holes may have different diameters, and may also assume any of a number of shapes in any conceivable pattern. When the fleece 15 is impinged on by the water jets 14, the fibers in the region of the holes in the pattern shell 7 move into the pattern shell, and the fleece 15 is needled and stabilized on the segments between the holes. However, displacement of the fibers into the holes in the thin structuring pattern shell 7 is limited, since a fine mesh of the sieve drum 6 is situated beneath the pattern shell 7. This mesh normally serves as support for a fleece that is to be needled smooth. The sprayed-on water is suctioned off inside the sieve drum 6. The fibers, however, remain on the sieve drum 6 and are also needled by the water jets 14 and thus stabilized there. A three-dimensional pattern is thus produced on one side in a fleece 15 that is stabilized over its entire surface.

FIG. 2 illustrates a longitudinal section along the center axis of the sieve drum 6 from FIG. 1, comprising a porous drum region 6' and the structuring pattern shell 7 that includes a structuring porous region 7'. The sieve drum 6 is supported on the suction tube 1 via a rear bearing 2 and an associated rear bearing flange 4, and is supported on a front bearing pin 11 for the suction tube 1 via a front bearing 3 and an associated front bearing flange 5. The structuring pattern shell 7 is fitted over the sieve drum 6, and a toothed ring 9 for the pattern shell 7 engages with a complementary toothed ring 8 on the rear side of the sieve drum 6. The pattern shell 7 is thus supported on the sieve drum 6 in a rotationally fixed manner. A flange 12 for the pattern shell 7 is screwed to the front operator side of the sieve drum 6 by means of fastening screws 10, thereby fixing the pattern shell 7 in place also in the axial direction relative to the sieve drum 6. The pattern shell 7 is thus quickly and securely fastened. The structuring pattern shell 7 is, for example, a smooth microporous shell, or a shell having any given structure made of metal or plastic that in each case has a structuring porous region 7'. Reference numeral X1 denotes the water-jet length for the water beam located above the sieve drum 6, and X2 denotes the length of the suction slot in the suction tube 1 for suctioning off the water from the water jets 14.

FIG. 3 illustrates a side view of the sieve drum 6 and the pattern shell 7 attached thereto. This figure shows particularly clearly the manner in which the toothed ring 8 for the sieve drum 6 and the complementary toothed ring 9 for the pattern shell 7 mesh with each other, thereby preventing twisting of the sieve drum 6 and pattern shell 7 relative to each other.

LIST OF REFERENCE NUMERALS

1 Suction tube
2 Rear bearing
3 Front bearing
4 Rear bearing flange
5 Front bearing flange
6 Sieve drum
6' Porous drum region
7 Structuring pattern shell
7' Structuring porous region of the pattern shell
8 Toothed ring
9 Counter-toothed ring
10 Fastening screws
11 Bearing pin
12 Flange
13 Nozzle beam
14 Water jets
15 Fleece
X1 Length of the water jet for the water beam located above the drum
X2 Length of the suction slot in the suction tube

The invention claimed is:

1. An apparatus for patterning and stabilizing a nonwoven fleece web, the apparatus comprising:
   a sieve drum extending along an axis;
   a pattern shell fittable over the drum and formed with a plurality of pattern-forming holes;
   axially interengaging formations on the sieve drum and on the pattern shell for rotationally locking the pattern shell to the sieve drum;
   means for passing the web tangentially over the shell at the holes; and
   means for directing fluid jets radially inward against the web at the holes and for withdrawing fluid from the jets from inside the drum.

2. The patterning and stabilizing apparatus defined in claim 1 wherein the pattern shell has a rear end provided with a ring formed with an array of axially rearwardly directed teeth and the sieve drum has a rear end provided with a ring formed with an array of axially forwardly directed teeth fittable between the teeth of the pattern-shell ring.

3. The patterning and stabilizing apparatus defined in claim 2 wherein the pattern-shell ring is fixed on the pattern shell and the sieve-drum ring is fixed on the sieve drum.

4. The patterning and stabilizing apparatus defined in claim 2, further comprising
   a plate at a front end of the sieve drum bearing axially rearward on the pattern ring and pushing the pattern-ring teeth against the sieve-drum teeth; and
   means releasably securing the plate to the front end of the sieve drum.

5. The patterning and stabilizing apparatus defined in claim 4 wherein the means releasably securing is screws engaged axially through the plate in the sieve drum.

6. The patterning and stabilizing apparatus defined in claim 1 wherein the drum and shell are both substantially cylindrical and coaxial.

7. The patterning and stabilizing apparatus defined in claim 1 wherein the means for directing fluid jets includes a nozzle beam extending axially along and spaced radially from the drum.

* * * * *